Aug. 27, 1929.  J. S. REYNOLDS  1,726,517
HYDRAULIC BRAKING SYSTEM

Filed Oct. 1, 1925   3 Sheets-Sheet 1

INVENTOR.
Joy S. Reynolds
BY
ATTORNEY.

Aug. 27, 1929.  J. S. REYNOLDS  1,726,517
HYDRAULIC BRAKING SYSTEM
Filed Oct. 1, 1925   3 Sheets-Sheet 2

INVENTOR.
Joy S. Reynolds
BY
ATTORNEY.

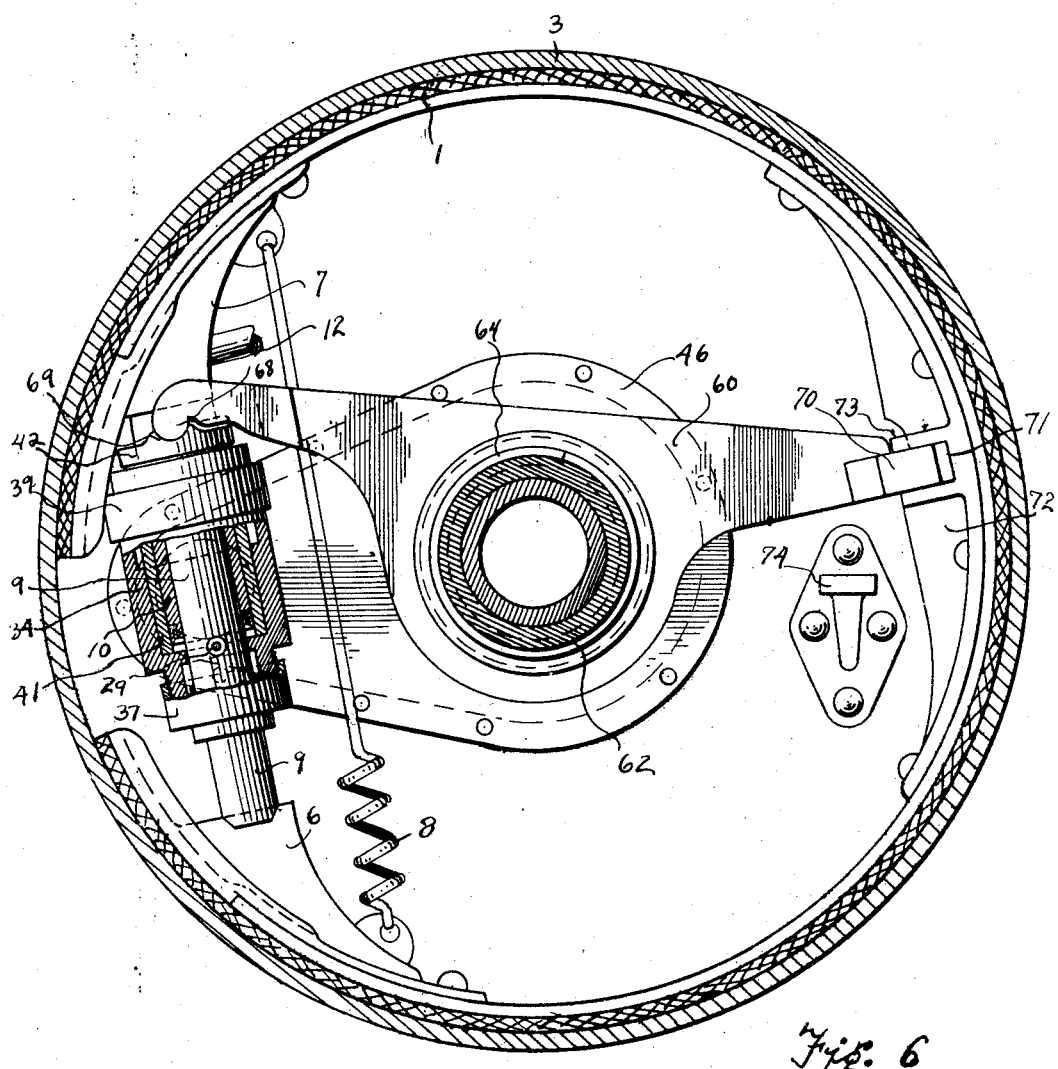

Patented Aug. 27, 1929.

1,726,517

UNITED STATES PATENT OFFICE.

JOY S. REYNOLDS, OF DETROIT, MICHIGAN.

HYDRAULIC BRAKING SYSTEM.

Application filed October 1, 1925. Serial No. 59,814.

This invention relates to hydraulic brakes for vehicles and the object of the invention is to provide a simple and efficient apparatus actuated through hydraulic pressure to cause the brake band to engage the drum of a wheel and to apply the torque at two points on the band so that each half of the band has an equal braking effect.

With the usual brake bands, either of the hydraulic or mechanical type, one-half the band has greater braking effect upon pressure being applied than the other half due to what is termed the "wrapping" action inasmuch as one-half the band is moved to engagement with the drum in the direction of movement of the drum while the other part is moved in a direction contrary to movement of the drum. This invention seeks to overcome this fault and to apply the pressure on each half of the brake band in the direction of rotation of the drum.

Further features of the invention are involved in the construction of the expander by means of which the hydraulic pressure applied thereto in setting the brake is transmitted through the instrumentality of the expander to another braking element and also by the construction of which torque developed in setting the brake is applied at different points to the braking element. These and other features and objects are hereinafter more fully described and claimed, and the preferred form of construction of a brake embodying these various features of my invention is shown in the accompanying drawings in which—

Fig. 4 is a detail in section taken on line 4—4 of Fig. 1.

Fig. 6 is a view similar to Fig. 1 and showing the parts in the position assumed when the brake is set.

The principal feature of this invention is a brake construction in which the torque is applied to the band at two points whereby each half of the band has substantially equal braking effects and in the accompanying drawings I have shown this feature in conjunction with a brake adapted to be actuated hydraulically although it is to be understood that the means of applying the force at two points may be applied in any approved manner within the scope of the appended claims.

Figure 2:
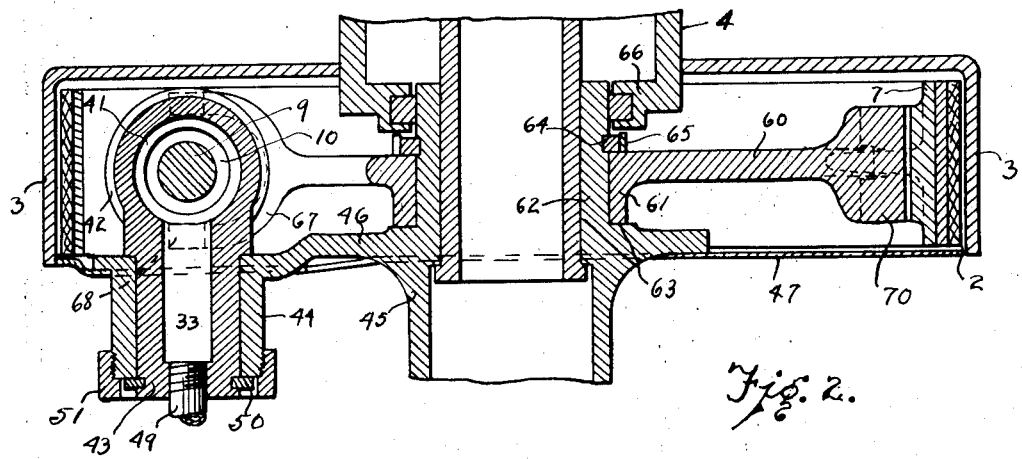
Fig. 2 is a cross section taken on line 2—2 of Fig. 1.

By illustration of my invention I have shown an internal or expanding type of band which is indicated at 1 and is of the split type. This band is usually provided with a facing, indicated at 2 in Fig. 2, which engages the interior of the brake drum 3 attached as indicated in Fig. 2 to the hub 4 of the vehicle wheel.

Figure 1:
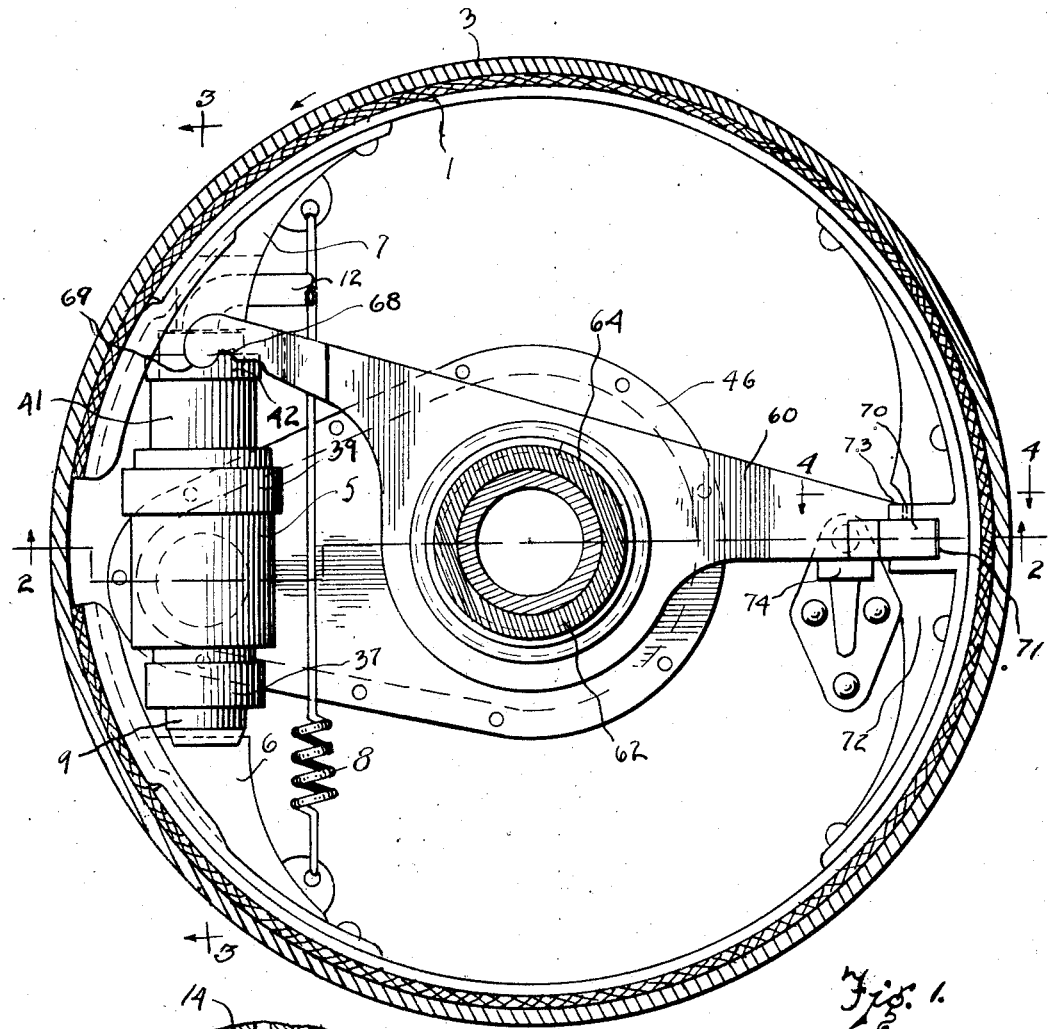
Fig. 1 is an elevation on the inside of a brake drum showing the braking elements in full lines in normal position.
Figure 5:
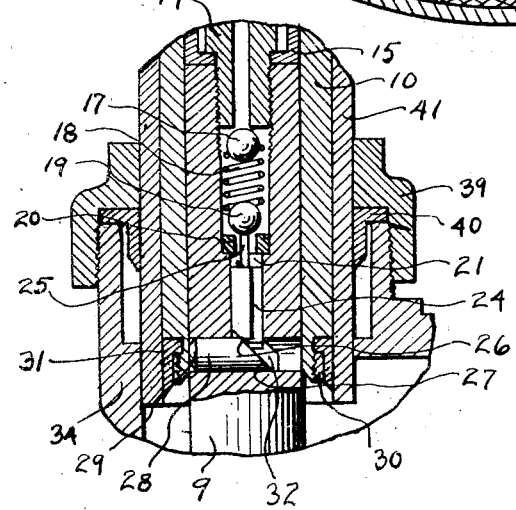
Fig. 5 is a detail in section of a portion of the expander showing the valve operation.
Figure 3:
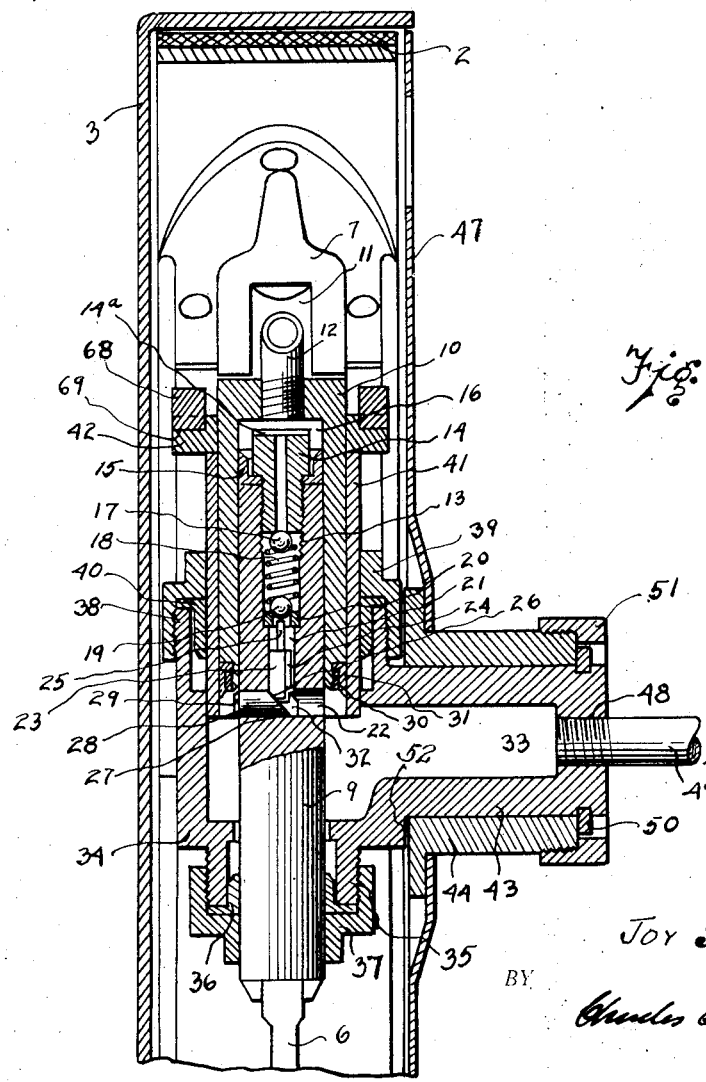
Fig. 3 is a cross section of the expanding element taken on line 3—3 of Fig. 1.

Between the two ends of the band on the one side thereof is mounted the expander indicated generally at 5, the construction of which will be hereinafter described and this expander is positioned across the two ends of the band at one side thereof as indicated in Fig. 1. One of said ends has ribbed terminal portions 6 and the other end has a ribbed portion 7. The band tends to be contracted by a spring 8 out of frictional engagement with the face of the drum. The expander has a plunger 9 grooved to engage the rib 6 as shown in Fig. 3 and also is provided with a plunger 10 engaging the rib 7. It will be observed from Fig. 3 that this rib 7 is recessed at 11 and the supply tube 12 extends into this recess and is threaded into the end of the member 10 which is hollow and receives a companion member 9 which is relatively movable therein. It is to be understood that pressure may be applied to the tube 12 in any approved manner. The plunger 9 has a longitudinal bore 13 extending part way of its length from the end within the member 10 and threaded into this member 9 at the inner end is a centrally apertured plug 14 which is headed and engages the packing cup 15 of leather or other desired material on the end of the plunger 9. This packing means prevents fluid under pressure in the chamber 16 from passing between the two members 9 and 10 and fluid can only flow through the hollow interior of the member 14. Within the bore 13 is a ball 17 which, by means of the spring 18 is held against a seat provided on the inner end of the member 14. Also in the recess or bore 13 is a ball 19 held by the same spring 13 against a seat 20 provided in the bore. The bore 13 continues beyond the seat 20 and is there of smaller diameter indicated at 21 and opens into a cross aperture 22. In this portion 21 of the bore 13 is a plunger 23 grooved at one or more places as indicated at 24 to permit oil to flow past the plunger 23 into the cross bore 22. This plunger 23 has a stem 25 extending through the aperture of the ball seat 20 and under normal conditions practically in engagement with the ball 19. The plunger 23 has a beveled end 26 which extends into the cross bore and engages a similar beveled portion 27 of the plunger 28 in the cross bore 22. This plunger 28 has a beveled outer end 29 which may under certain conditions engage the inner beveled end of the plunger 10. The opposite end of the member 28 has a hooked portion 32 and the beveled end 26 of the plunger 23 lies against this beveled portion 27 of the member 28 and beneath the hook 32 so that when the parts are assembled the member 28 is retained in position as shown in Fig. 3. The tension of the spring 18 forcing the ball 19 onto its seat also holds the plunger 23 with its beveled end 26 against the beveled end 27 of the member 28 but when the plunger 9 moves inwardly of the plunger 10, under conditions as hereinafter stated, the plunger 28 is forced into the aperture 22 by the beveled end of the member 10. This raises the ball 19 from its seat as shown in Fig. 5 and allows fluid to be transmitted from the chamber 16 between the two plungers through the aperture of the plug 14 and through the bore 13 and bore 21 into the chamber 33 formed in the outer body 34 in which the plungers are positioned. This body is apertured and provided with a threaded hub 35 at one end through which the plunger 9 projects and a packing 36 has its inner end lying in close engagement with the plunger 9 and is secured in position by a cap nut 37 on the threaded hub 35. The body is also provided with a threaded cylindrical portion 38 at the opposite end in axial alignment with the hub 35 and receives a cap nut 39 which engages the packing 40 in a similar manner to that indicated with the packing member 36. This packing 40 lies closely in engagement with a third plunger 41 about the exterior of the plunger 10. The plunger 10 has a threaded part at the inner end on which is threaded a ring 30 by means of which the cupped packing 31 is held in place. This packing prevents flow of fluid between the members 10 and 41.

Slidable on the plunger 10 is a collar 42 which may be integral with the plunger 41 if desired, and the inner end of this plunger 41 as well as the inner end of the plunger 10 extends into the recess 33 in the body and bore. These plungers 10 and 41 are subject to influence of pressure within this chamber 33. It is to be understood that the thickness of the wall of the plunger 41, which is of greatest diameter, is less than the thickness of the wall of the plunger 10 therewithin. This difference in thickness of the wall may be varied but preferably is such that pressure on the ends of the two plungers is equal to— that is, the two ends have approximately the same surface area subject to pressure accumulated in the chamber 33.

The expander body is provided with a hollow extension 43 on one side thereof at a right angle to the line of movement of the plungers 9 and 10. This extension 43 is supported in a boss 44 at one side of the brake drum and preferably formed integrally with the flange 46 of the axle housing 45 as will be understood from Fig. 1. A plate 47 is supported by the flange fitting within the brake drum 3 as shown in Fig. 2. This extension 43 of the expander unit is provided with a threaded aperture 48 opening to the chamber 33 and to which the conduit 49 is connected. At its outer end the member 43 has a peripheral groove in which fits a ring 50 formed of two similar halves. This ring 50 is held in place by a nut 51 threaded on the boss 44 as shown in Fig. 3. The nut 51 has a central aperture fitting about the ring 50 when the two halves are positioned in the groove and prevent accidental removal thereof. The ring serves to maintain the expander unit in position in the boss 44 and the body of the expander is provided with a shoulder 52 engaging the inner face of the boss and the expander is oscillatable in this boss 44 on the axis of the hollow extension 43. The conduit 49 is for the purpose of transmitting pressure accumulated in the chamber 33 to another unit or units or to any place where fluid under pressure is desired.

The action of the expander will be understood from the foregoing and in this operation the action is as follows: Pressure accumulated in the conduit 12 in any approved manner, as heretofore mentioned, passes into the chamber 16 and under normal conditions tends to move the plungers 9 and 10 in opposite directions causing the brake band to be expanded to frictionally engage the drum. As the brake band 1 is free to turn to a limited extent with the drum and the expander is oscillatably mounted, the band will turn with the drum to an extent permitted by the expander which may assume the position shown in Fig. 6. This turning of the expander on its axis to the position shown in Fig. 6 and "seizing" of the brake band on the drum causes movement of the lever 60. This movement of the lever 60 causes pressure to be exerted on the fluid within the chamber 33 approximately equal to the pressure applied by the foot brake in expanding the elements 9 and 10. This will be understood from the following:

The lever 60, as will be understood from Fig. 2, has a central hub 61 pivotally mounted on the portion 62 of the axle housing within the wheel hub. This lever is held in position against a shoulder 63 on one side by a two-part ring 64 seated in a groove in the portion 62 and held from displacement by a ring 65 fitting thereover and held from displacement by a portion 66 of the wheel hub on which the brake band is mounted. One end of the lever 60 is forked as indicated at 67 and these forked ends have a rounded portion 68 which engages in the recess 69 on opposite sides of the collar 42 as shown in Fig. 3. The opposite end of the lever has a part 70 fitting in a recess 71 provided in the ribbed casting 72 secured to the brake band as shown in Figs. 1 and 2. It is to be noted from Fig. 1 and detail Fig. 4 that the side wall forming the recess 71 is slotted at 73 and the lever at this point is shaped to fit in the slot. This prevents the band from sidewise movement at this point relative to the brake drum. The drum rotates in a direction indicated by the arrow and held from turning in the opposite direction by a lug 74 secured to the inner face of the drum. Therefore, upon pressure being applied to the expander and the band expanded with the drum rotating in the direction of the arrow the band will tend to follow the drum moving the lever from the position shown in full lines in Fig. 1 to a position at which the fluid in the chamber 33 builds up resistance. This resistance to movement is built up in the following manner: The lever 60 moving with the band, due to the end 70 lying in the socket 71, causes the forked end 65 of the lever to exert pressure upon the plunger 41 moving it inwardly of the chamber 33 and producing a pressure on the fluid therein. This movement of the band also by reason of the plunger 10 seating against the rib 7 of the band forces the plunger 10 inwardly of the chamber 33 also tending to produce pressure therein and with the surface areas of the ends of the plungers 10 and 41 being equal the resistance to movement of the plungers 10 and 41 is equal. It is thus to be seen that the frictional engagement of the band with the drum produces a pressure in the chamber 33 and it is this pressure which is transmitted to the conduit 49 and to another braking element. This condition exists when the chamber 33 and conduit system 49 connected therewith is full of liquid. If this chamber 33 and conduit system is not filled with fluid the spring 8 will, when no pressure is applied in the chamber 16, cause the plunger 9 to move in the member 10 until the end of the plug 14 strikes the bottom of the recess of the plunger 10. The plug 14 has a cross groove 14ª in the end thereof so that this setting of the plug against the bottom of the member 10 will not close the opening of the conduit 12 to the chamber 16. This relative movement of the members 9 and 10 to an extent beyond the normal position shown in Fig. 2 causes the plunger 28 to be moved into its channel 22 due to engagement of the beveled end thereof with the beveled end of the plunger 10. This movement of the plunger 28 also moves the plunger 23 and unseats the ball 19 as will be readily understood. As both these plungers 23 and 28 are shaped to permit flow of fluid past the plungers in the channels in which the plungers lie the first application of pressure in the chamber 10 under the condition stated will cause fluid to pass through the central aperture of the plug 14 through the bore 13 and past the plug 23 and through the channel 22 and into the chamber 33 and thus replenishing the liquid in the said chamber and connected system, and the brake band cannot be set until the parts 9 and 10 have moved relatively to the position shown in Fig. 3 and ball 19 seated. Thus, any loss of fluid in the chamber 33 and conduit 49 is automatically compensated for by application of fluid under pressure in the line 12.

It is to be noted that pressure in the chamber 33 reacts through the lever 60 to the band through the casting 72 and the expansion of the member 9 setting the brake band applies the pressure on the left half of the band in the direction of rotation of the drum.

The torque is therefore applied to the band at two points. In other words—the band is energized at two points of its circumference through this peculiar arrangement of parts. This will be understood from the following: Upon pressure being applied through the tube 12 to expand the members 9 and 10 and the band begins to turn with the drum, the plunger 10 will be projected from the body only at the time the initial pressure is applied and then only to an extent to cause frictional engagement of the band with the drum whereupon, as the band begins to turn and due to connection of the lever 60 with the band and the plunger 41 and the direct engagement of the end of the band with the end of the plunger 10, the said plunger 10 will have a tendency to move inwardly of the body into the chamber 33. Under this condition the pressure applied between the members 9 and 10 will be effectively applied through the plunger 9 in moving its end of the band to braking engagement with the drum. Upon movement of the band in the direction of rotation of the drum to an extent where turning the lever 60 is resisted there comes to be applied a pressure in the opposite direction by the lever end 70. Also, at the time of the initial pressure being applied between the plungers 9 and 10 the plunger 10 moves its ends of the brake band to engagement with the drum but, as above described, the plunger 10, due to its being subject to influence of pressure in the chamber 33, merely provides a means limiting the movement of the band with the drum. In other words, it provides a stop for the end of the band engaged by the plunger 10 and the band is energized and brake applied on the right half of the drum in the direction of movement of the drum due to swinging of the point 70 from the position shown in Fig. 1 to the position shown in Fig. 6. The torque arising through the initial application of pressure to expansion of the members 9 and 10 is therefore applied at two points to the band. Therefore, by the mechanism described I have been able to distribute the torque so that each half the band is energized to the same extent providing the surface areas of the inner ends of the members 41 and 10 are equal. As previously stated, these surface areas may be varied and the torque applied to a greater extent to one portion of the band than to the other as may be found desirable.

As will be understood from the foregoing, the expander is so constructed as to act as accumulator to transmit pressure to another point. By the arrangement herein described the transmitted pressure is determined by the torque developed in the setting of the band. It is therefore evident that the described construction is simple and comparatively inexpensive and in comparison with previous constructions requires a less number of parts and that the various objects of the invention are secured by the described arrangement.

Having thus fully described my invention, what I claim and desire to secure by Letters Patent of the United States is—

1. In a hydraulic brake, the combination with a brake drum, of a brake band, hydraulically operated means for causing engagement of the band with the drum, said band being adapted to turn with the drum to a limited extent, and means whereby the torque developed in the setting of the band is applied at two points of the band in the direction of its rotation.

2. In a hydraulic brake, the combination with a brake drum, of a brake band, hydraulically operated means for causing engagement of the band with the drum, said band being mounted to turn with the drum, a chamber for fluid, means whereby pressure is applied to the fluid in the chamber by the turning of the band with the drum, and means for applying the pressure developed in the chamber at two points on the band.

3. In a hydraulic brake, the combination with a drum, of a split band, a hydraulically operated means for causing the band to engage the drum comprising an expander having two plungers, means for applying pressure between the plungers, there being a connection between the plunger and the two ends of the bands whereby movement of the plungers in opposite directions causes the band to engage the drum, the said expander having a chamber for fluid and one of the plungers having an end surface thereof subject to influence of pressure within the chamber, said band being mounted to turn with the drum and thereby cause the last named plunger to move inwardly of the said chamber and develop pressure in the chamber to resist rotation of the band, and a conduit to which pressure developed in the chamber is transmitted.

4. In a hydraulic brake, the combination with a brake drum, of a split internal expansible band, an expander comprising a body having a chamber for fluid and two plungers movable in the said body, one of the said plungers being hollow and the other slidable therein and providing a chamber for fluid between the plungers, the outer plunger having its inner end within the said chamber of the body and subject to influence of pressure therein, the said plunger being connected with one end of the said band and the other plunger with the other end of the said band whereby pressure between the plungers causes the band to engage the drum, the said band being mounted to rotate with the drum and to thereby cause pressure within the body chamber to resist and limit rotation of the band with the drum, and a conduit open to said chamber for transmitting fluid under pressure to a distant point.

5. In a hydraulic brake, the combination with a brake drum, of an internal expanding brake band mounted to permit turning with the drum by frictional engagement therewith, an expander between the two ends of the band comprising a body having a chamber for fluid and being pivotally mounted at a fixed point adjacent the band ends, oppositely disposed plungers in the body respectively connected with the two ends of the band, means for applying hydraulic pressure between the plungers to cause movement of the same in opposite directions and thereby cause engagement of the band with the drum, one of the said plungers having an end surface extending into the said fluid chamber of the body and movement of the band with the drum causing the said plunger to be moved inwardly of the fluid chamber developing a pressure on the fluid to resist rotation of the band, and a third plunger having an end area subject to influence of pressure in the said chamber, a pivoted lever having an end engaged by the said third plunger and the opposite end to engage the band at a predetermined point whereby pressure developed in the chamber is applied to the band at a point distant from the said ends thereof.

6. In a hydraulic brake, the combination with a brake drum, a band adapted to be brought to engagement with the drum, said band being mounted to turn with the drum, hydraulically actuated means for causing engagement of the band with the drum comprising a body having a chamber for fluid, plungers therein adapted to be moved by hydraulic pressure to cause engagement of the band with the drum, and means whereby engagement of the drum by the band produces pressure on the fluid in the chamber, and a fluid conduit connected with the said chamber.

7. In a hydraulic brake, the combination of a drum, a band adapted to be brought to engagement with the drum and to turn therewith, said band being of the split internal type, an expander pivotally supported at a fixed point adjacent the ends of the band, said expander including a pair of plungers, each connected respectively with an end of the band whereby upon application of pressure between the plungers the band is expanded and caused to turn with the drum, the turning of the band with the drum causing fluid pressure to be developed within the expander to resist the turning of the band and limiting the extent of its rotative movement.

8. In a hydraulic brake, the combination with a drum, a brake band of the split internal expanding type and an expander therefor comprising a body having a chamber for fluid, a pair of plungers therein, one of said plungers being hollow and the other plunger riding therein and adapted upon pressure being applied between the plungers to cause movement thereof in opposite directions, the outer end of one plunger engaging an end of the band and the outer end of the other plunger engaging the other end of the band whereby upon expansion the band is caused to engage the drum, said hollow plunger having an end thereof extending into the said chamber for fluid and a third plunger comprising a cylindrical shell slidable on the said hollow plunger and having an end surface subject to influence of the pressure on the band, a pivotally mounted lever having an end engaging the said third plunger and the opposite end engaging the band at a point distant from the split ends, the said band being mounted to turn with the drum upon engagement therewith to cause both the last named plungers to move inwardly of the chamber for fluid whereby pressure is developed in the chamber in resistance to rotation of the band and pressure developed in the chamber is applied through the lever to a point in the band distant from the split ends.

In testimony whereof I sign this specification.

JOY S. REYNOLDS.